US010041585B2

(12) United States Patent
Sugimoto et al.

(10) Patent No.: US 10,041,585 B2
(45) Date of Patent: Aug. 7, 2018

(54) ELECTROMAGNETIC VALVE CONTROL SYSTEM AND A METHOD OF CONTROLLING THE ELECTROMAGNETIC VALVE

(71) Applicant: NIDEC TOSOK CORPORATION, Zama, Kanagawa (JP)

(72) Inventors: Yoshihisa Sugimoto, Zama (JP); Naoki Kobayashi, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 264 days.

(21) Appl. No.: 14/965,322

(22) Filed: Dec. 10, 2015

(65) Prior Publication Data

US 2016/0178053 A1    Jun. 23, 2016

(30) Foreign Application Priority Data

Dec. 18, 2014  (JP) ................. 2014-255945

(51) Int. Cl.
*F16H 61/02* (2006.01)
*F16H 61/00* (2006.01)

(52) U.S. Cl.
CPC ..... *F16H 61/0202* (2013.01); *F16H 61/0025* (2013.01); *F16H 61/0276* (2013.01)

(58) Field of Classification Search
CPC ............. F16H 61/0021; F16H 61/0025; F16H 61/0202; F16H 61/0276
See application file for complete search history.

(56) References Cited

U.S. PATENT DOCUMENTS

| 5,186,204 A * | 2/1993 | Oka ................... F16H 61/0251 137/238 |
| 2010/0263951 A1* | 10/2010 | Hayashi ................. B60K 6/445 180/65.275 |
| 2012/0252612 A1* | 10/2012 | Kodama ........... F16H 61/66272 474/69 |
| 2013/0012354 A1* | 1/2013 | Shimizu .............. F16H 61/0206 477/83 |

FOREIGN PATENT DOCUMENTS

| JP | 2009234522 A | 10/2009 |
| JP | 2014119048 A | 6/2014 |

* cited by examiner

*Primary Examiner* — Edwin A Young
(74) *Attorney, Agent, or Firm* — Cantor Colburn LLP

(57) ABSTRACT

An electromagnetic valve control apparatus controlling an electromagnetic valve in a control valve apparatus supplying driving oil to an automatic transmission may include an electromagnetic valve driving circuit structured to apply a driving current to the electromagnetic valve based on a set driving condition; an operating state input unit structured to input an engine operating state of the vehicle; an oil pressure state decision unit structured to decide an oil pressure state from a pressure value of the oil at an output side of the electromagnetic valve; a storage unit structured to store decision results of the oil pressure state decision unit; and a driving condition setting unit structured to set the driving condition based on the decision results stored in the storage unit in response to a determination that an engine operating command signal is input based on the operating state input to the operating state input unit.

12 Claims, 10 Drawing Sheets

ELECTROMAGNETIC VALVE CONTROL SYSTEM AND A METHOD OF CONTROLLING THE ELECTROMAGNETIC VALVE

CROSS REFERENCE TO RELATED APPLICATIONS

The present invention claims priority under 35 U.S.C. § 119(a)-(d) to Japanese Patent Application No. 2014-255945, filed Dec. 18, 2014, the entire content of which is incorporated herein by reference.

FIELD OF THE DISCLOSURE

The present disclosure relates to electromagnetic valve control system and a method of controlling the electromagnetic valve.

BACKGROUND

Movement of an automatic transmission of an automobile is controlled by oil which is supplied from a control valve. In a control valve system, a proportional electromagnetic valve is provided to change output pressure of the oil. The proportional electromagnetic valve moves a plunger in accordance with a drive current supplied to the electromagnetic valve, and adjusts passage amount or output pressure of the oil. A conventional proportional electromagnetic valve is described in, for example, Japanese Patent Application Publication No. H11-287351. As described in this publication, in general, a proportional electromagnetic valve is driven by a pulse drive current (PWM signal).

A so-called oil vibration phenomenon that oil is pulsated at an output side of an electromagnetic valve is likely to occur upon the driving of a proportional electromagnetic valve. When oil is supplied to an automatic transmission, it is preferable to suppress the oil vibration. Meanwhile, if a frequency of a PWM signal that is a driving current is increased, the oil vibration may be decreased. In this case, however, durability and reliability of the electromagnetic valve may deteriorate. Meanwhile, when the frequency of the PWM signal that is the driving current is decreased, it is possible to suppress the deterioration in durability and reliability of the electromagnetic valve. However, the oil vibration is increased. As such, the oil vibration and the deterioration in durability and reliability of the electromagnetic valve have a trade-off relationship with each other. Therefore, it is difficult to simultaneously suppress the oil vibration and the durability and reliability of the electromagnetic valve.

A permissible range of oil-vibration and hysteresis is changed by an environmental condition in which the electromagnetic valve is used. For example, in a control valve system, a permissible range of oil pressure and a permissible range of hysteresis are different from each other based on the type of the automatic transmission to be controlled, vehicle type, number of engine revolutions, and other environmental conditions. Therefore, it is preferable to set the frequency of the driving current by estimating the occurrence situation of the oil vibration in a driving period start from the driving of the proportional electromagnetic valve.

SUMMARY

An exemplary embodiment of the present disclosure relates to an electromagnetic valve control apparatus controlling an electromagnetic valve interposed in an oil passage in a control valve apparatus supplying driving oil to an automatic transmission for a vehicle. The electromagnetic valve control apparatus includes an electromagnetic valve driving circuit, an operating state input unit, an oil pressure state decision unit, a storage unit, and a driving condition setting unit. The electromagnetic valve driving circuit applies a pulse-like driving current to the electromagnetic valve based on the set driving condition. The operating state input unit inputs an engine operating state of a vehicle. The oil pressure state decision unit decides an oil pressure state based on a pressure value of the oil at an output side of the electromagnetic valve. The storage unit stores decision results of the oil pressure state decision unit. The driving condition setting unit sets the driving condition based on the decision results stored in the storage unit if it is determined that an operating command signal of the engine is input based on the operating state input to the operating state input unit.

An exemplary embodiment of the present disclosure relates to an electromagnetic valve control apparatus controlling an electromagnetic valve interposed in an oil passage in a control valve apparatus supplying driving oil to an automatic transmission for a vehicle. The electromagnetic valve control apparatus includes an electromagnetic valve driving circuit, an operating state input unit, a storage unit, an oil pressure state decision unit, and a driving condition setting unit. The electromagnetic valve driving circuit applies a pulse-like driving current to the electromagnetic valve based on the set driving condition. The operating state input unit inputs an engine operating state of a vehicle. The storage unit stores a pressure value of oil at an output side of the electromagnetic valve. The oil pressure state decision unit decides an oil pressure state based on the pressure value stored in the storage unit. The driving condition setting unit sets the driving condition based on the decision results of the pressure state decision unit if it is determined that an operating command signal of the engine is input based on the operating state input to the operating state input unit.

An exemplary embodiment of the present disclosure relates to an electromagnetic valve control method controlling the electromagnetic valve by applying a pulse-like driving current to the electromagnetic valve interposed between an input side and an output side of an oil passage in a control valve apparatus supplying driving oil to an automatic transmission for a vehicle. The electromagnetic valve control method includes a) detecting a pressure, b) deciding an oil pressure state, c) storing, and d) setting a driving condition. In the pressure detecting process a), a pressure value of the oil at an output side of the electromagnetic valve is detected. In the oil pressure state deciding process b), after the process a), the oil pressure state is decided based on the pressure value. In the storing process c), after the pressure b), the decision results in the process b) are stored in the storage unit. In the driving condition setting process d), after the process c), a driving frequency of the driving current applied to the electromagnetic valve is set based on the decision results stored in the storage unit when the engine operation starts.

An exemplary embodiment of the present disclosure relates to an electromagnetic valve control method controlling the electromagnetic valve by applying a pulse-like driving current to the electromagnetic valve interposed between an input side and an output side of an oil passage in a control valve apparatus supplying driving oil to an automatic transmission for a vehicle. The electromagnetic valve control method includes e) detecting a pressure, f)

storing, g) deciding an oil pressure state, and h) setting a driving condition. In the pressure detecting process e), a pressure value of the oil at an output side of the electromagnetic valve is detected. In the storage process f), after the process e), the pressure value is stored in a storage unit. In the oil pressure state deciding process g), after the process f), the oil pressure state is decided based on the stored pressure value. In the driving condition setting process h), after the process g), a driving frequency of the driving current applied to the electromagnetic valve is set based on the decision results when the engine operation starts.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Herein, an exemplary embodiment of the present disclosure will be described with reference to the accompanying drawings.

1. Structure of Control Valve System

Figure 1:
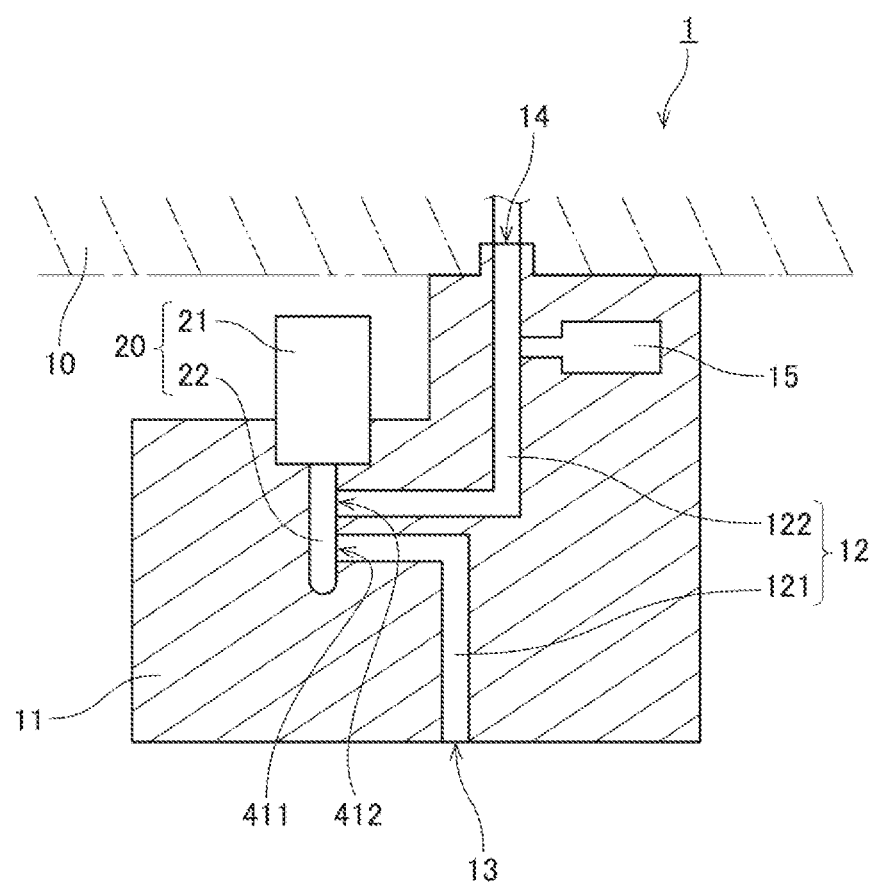
FIG. 1 is a schematic cross-sectional view of a control valve apparatus according to a first preferred embodiment.

FIG. 1 is a rough cross-sectional view of a control valve system 1 according to a first embodiment. The control valve system 1 is a system provided to a vehicle, such as an automobile and the like, which controls the drive of an automatic transmission 10 disposed inside the vehicle by supplying oil (automatic transmission fluid, ATF) thereto. As shown in FIG. 1, the control valve system 1 comprises a valve body 11 which is formed by aluminum die casting and the like, and an electromagnetic valve 20.

A plurality of oil paths 12, which function as an oil flow path, are provided inside the valve body 11. The plurality of oil paths 12 are convoluted inside the valve body 11. FIG. 1 conceptually illustrates only a part of the plurality oil paths for a clear understanding. In the example shown in FIG. 1, the control valve system 1 is attached to a bottom surface side of the automatic transmission 10. The oil paths 12 are formed between an oil inlet 13 provided to a bottom surface of the valve body 11 and an oil receipt-delivery port 14 provided to a top surface of the valve body 11.

The electromagnetic valve 20 in this embodiment comprises a spool 42, a so-called spool plate, which will be described later. The electromagnetic valve 20 has a main body 21 and a nozzle portion 22. The nozzle portion 22 has a substantially cylindrical shape and protrudes downward from the main body 21. An oil input port 411 and an oil output port 412 are provided on a lateral surface of the nozzle portion 22. Oil enters inside the nozzle portion 22 through the oil input port 411 and the oil output port 412. The electromagnetic valve 20 operates the spool 42 disposed inside the nozzle portion 22, and switches the communication state of the oil input port 411 and the oil output port 412.

The nozzle portion 22 is interposed among the oil paths 12 inside the valve body 11. Herein, a section closer to the input side than the nozzle portion 22 inside the oil paths 12 is referred to as a first oil path 121. A section closer to the output side than the nozzle portion 22 inside the oil paths 12 is referred to as a second oil path 122. The first oil path 121 connects the oil inlet 13 of the valve body 11 and the oil input port 411 of the nozzle portion 22. The second oil path 122 connects the oil output port 412 of the nozzle portion 22 and the oil receipt-delivery port 14 of the valve body 11.

When using the control valve system 1, oil is pressured by an oil pump which is not shown in the drawings, and flown into the first oil path 121 from the oil inlet port 13. The oil flows between the second oil path 122 and the automatic transmission 10 through the oil receipt-delivery port 14.

The control valve system 1 has a sensor 15 for measuring pressure and temperature of the oil. The sensor 15 exists inside the second oil path 122 which is closer to the output side than the nozzle portion 22, and measures pressure and temperature of the oil. In this embodiment, the sensor 15 which measures oil pressure and oil temperature is a single unit sensor. A sensor for measuring oil pressure and a sensor for measuring oil temperature may be separately provided.

2. Structure of Electromagnetic Valve

Herein, structure of the electromagnetic valve 20 will be described in detail. For easy explanation, a direction parallel to a center axis 9 of the electromagnetic valve 20 is referred to as "axial direction", a direction orthogonal to the center axis 9 of the electromagnetic valve 20 is referred to as "radial direction", and a direction along a circular arc having its center on the center axis 9 of the electromagnetic valve 20 is referred to as "circumferential direction".

Figure 2:
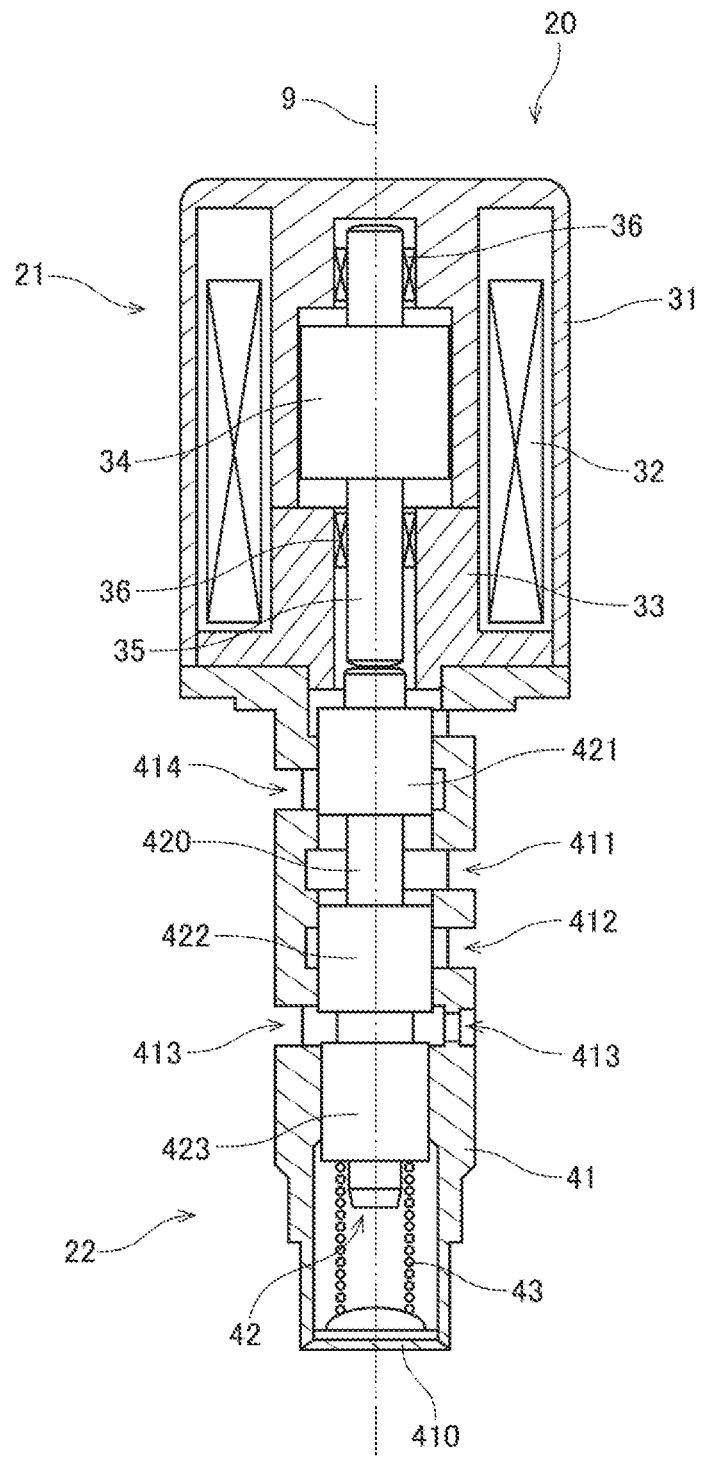
FIG. 2 is a cross-sectional view of an electromagnetic valve according to a first preferred valve.

FIG. 2 is a cross-section of the electromagnetic valve 20. The electromagnetic valve 20 is a so-called proportional electromagnetic valve, and is capable of continuously adjusting a valve opening degree in response to a drive current supplied to a electromagnetic 32. As described above, the electromagnetic valve 20 has the main body 21 and the nozzle portion 22.

As shown in FIG. 2, the main body 21 has a casing 31, a electromagnetic 32, a core 33, a plunger 34, and a rod 35. The casing 31 has an outer wall portion 311 having a substantially cylindrical shape. The electromagnetic 32, the core 33, the plunger 34 and the rod 35 are received inside the outer wall portion 311.

The electromagnetic 32 is composed of conductive wires wound around the center axis 9. At least a portion of the core 33, the plunger 34 and the rod 35 are disposed on a radially inner side of the electromagnetic 32. The plunger 34 is disposed above the core 33. The top surface of the core 33 faces the bottom surface of the plunger 34 in the axial direction. A magnetic material, for example, steel and the like, is used as a material of the core 33 and the plunger 34.

The rod 35 is a substantially columnar member extending along the center axis 9. The plunger 34 and the rod 35 are fixed to each other. The rod 35 is supported by a pair of bearings 36 which are disposed on the upper and lower sides of the plunger 34. With this, the rod 35 is axially movable integrally with the plunger 34.

The nozzle portion 22 has a sleeve 41, a spool 42, and a spring 43. The sleeve 41 is a substantially cylindrical member extending along the center axis 9. A lower end portion of the sleeve 41 is closed by a disc shape floor member 410. The sleeve 41 is provided with the oil input port 411, the oil output port 412, two feedback ports 413, and a discharge port 414. Each of these ports 411, 412, 413, 414 connects an inner space of the sleeve 41 with the oil paths outside the sleeve 41.

The spool 42 is received inside the sleeve 41. The spool 42 of this embodiment has a spool axis 420, a first valve body 421, a second valve body 422, and a third valve body 423. The spool axis 420 is a columnar member extending along the center axis 9. Each of the valve bodies 421, 422, 423 is fixed around the spool axis 420 and simultaneously in contact with an inner periphery of the sleeve 41.

A lower end portion of the rod 35 is in contact with an upper end portion of the spool 42. The spring 43, which is an elastic material, is axially compressed and interposed between a lower end portion of the spool 42 and the floor member 410. Therefore, the spool 42 and the rod 35 always receive upward pressure from the spring 42.

When the drive current is not supplied to the electromagnetic 32, the plunger 34, the rod 35, and the spool 42 move upward by the pressure received from the spring 43. Meanwhile, when the drive current is supplied to the electromagnetic 32, the core 33 is magnetized, and therefore the plunger 34 is pulled towards the core 33. Accordingly, the plunger 34, the rod 35, and the spool 42 move downward. When the rod 35 moves vertically, positions of the three valve bodies 421, 422, 423 which are fixed to the rod 35 also move vertically. As a result, a flux of oil flowing into the oil output port 412 from the oil input port 411 is changed.

3. Structure of Electromagnetic Valve Control System

Herein, a electromagnetic valve control system 50, which controls operation of the electromagnetic valve 20, is explained in detail. The electromagnetic valve control system 50 is composed of, for example, a circuit board having a plurality of electronic components mounted thereon. A portion of or all functions of the electromagnetic valve control system 50 may be configured by a microcontroller, or a general-purpose computer.

Figure 3:
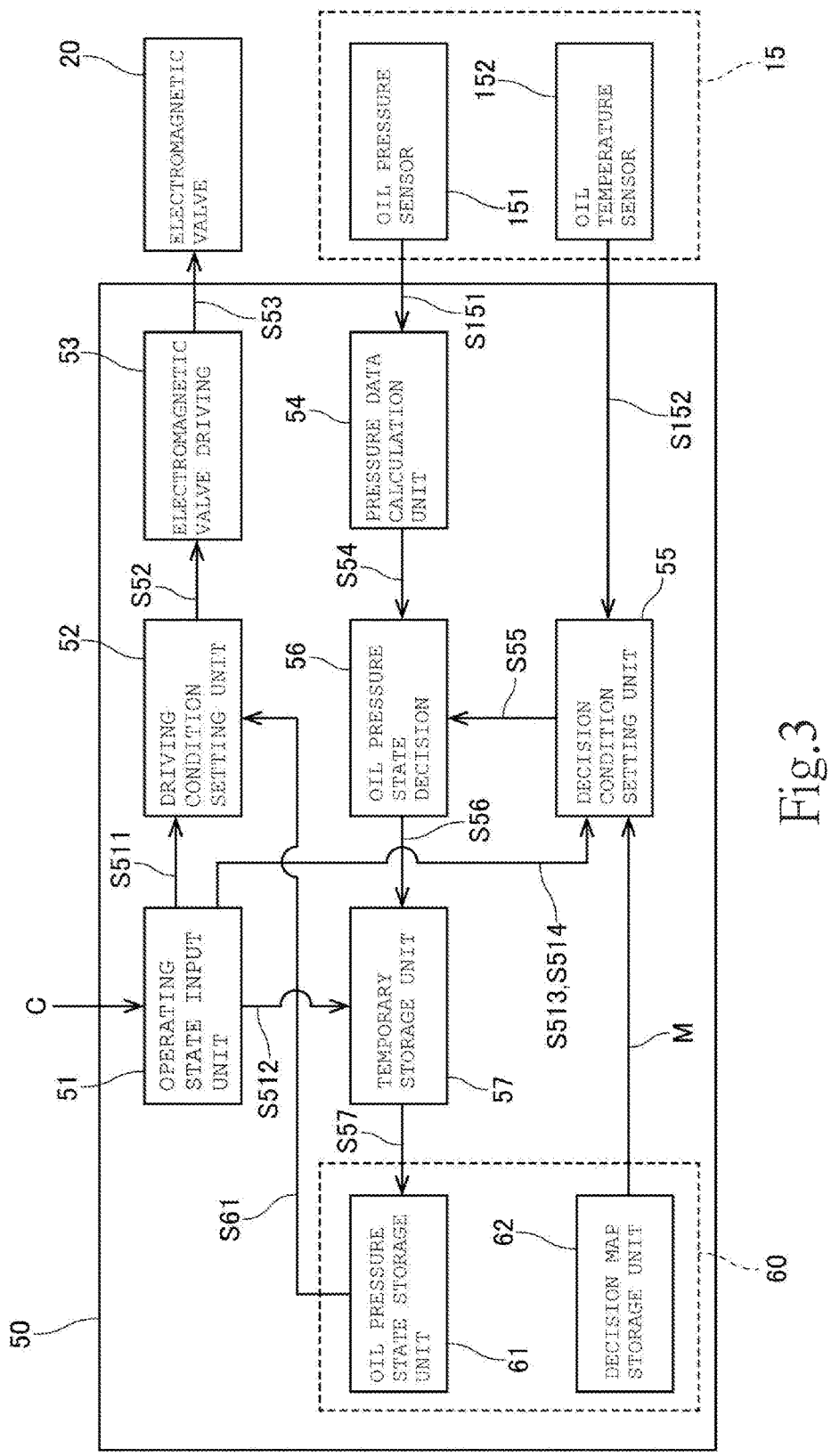
FIG. 3 is a block diagram illustrating a configuration of an electromagnetic valve control apparatus according to a first preferred embodiment.

FIG. 3 is a block diagram showing the structure of the electromagnetic valve control system 50. As illustrated in FIG. 3, the electromagnetic valve control apparatus 50 includes an operation state input unit 51, a driving condition setting unit 52, an electromagnetic valve driving circuit 53, a pressure data calculation unit 54, a decision condition setting unit 55, an oil pressure state decision unit 56, and a temporary storage unit 57. The electromagnetic valve control apparatus 50 has a nonvolatile member 60. The nonvolatile memory 60 includes an oil pressure state storage unit 61 and a decision map storage unit 62.

The operating state input unit 51 is an input port to which an engine operating state is input. The operating state input unit 51 receives vehicle information C from a vehicle such as a car in which the control valve apparatus 1 and the automatic transmission 10 are quipped through an on-board communication means such as a controller area network (CAN). The vehicle information C includes information on the engine operating state such as engine operating start information, engine operating stop information, and RPM of the engine. The vehicle information C includes information related to, for example, vehicle type, and type of the automatic transmission 10, and the like.

When receiving the engine operating start information as the vehicle information C, the operating state input unit 51 outputs an engine operating start signal S511 to the driving condition setting unit 52. That is, if it is determined that an operating command signal is input to the engine based on the input vehicle information C, the operating state input unit 51 outputs the engine operating start signal S511 to the driving condition setting unit 52. Meanwhile, when receiving the engine operating stop information as the vehicle information C, the operating state input unit 51 outputs an engine operating stop signal S512 to the temporary storage unit 57.

The operating state input unit 51 outputs kind information S513 indicating a kind of vehicles and a kind of automatic transmission 10 to the decision condition setting unit 55. During the engine operating period, the operating state input unit 51 outputs the RPM of the engine S514 to the decision condition setting unit 55 based on the vehicle information C.

The driving current S53 is a current supplied to the electromagnetic valve 20 by the electromagnetic valve driving circuit 53. If it is determined that the operating command signal is input to the engine, the driving condition setting unit 52 sets the driving condition of the electromagnetic valve 20 based on past information S61 stored in the oil pressure state storage unit 61. In detail, if it is determined that the engine operating start signal S511 is input from the operating state input unit 51, a driving frequency f of the driving current S53 is set based on the past determination result included in the past information S61. The driving condition setting unit 52 outputs the operating condition command signal S52 including the information of the set driving frequency f to the electromagnetic valve driving circuit 53. A detailed description of a method for setting a driving frequency f will be described below.

According to the preferred embodiment, the oil pressure state storage unit 61 stores an end time decision result which is a decision result finally decided during a previous continued operating time of the engine. That is, the driving condition setting unit 52 sets the driving frequency f based on the previous end time decision result.

The electromagnetic valve drive circuit 53 generates the drive current S52 on the basis of the drive frequency command signal S56. The electromagnetic valve drive circuit 53 generates a pulse drive current (PWM signal) in accordance with the drive frequency designated by the drive frequency command signal S56 and a separately designated drive current value. The electromagnetic valve drive circuit 53 applies the generated drive current S52 to the electromagnetic valve 20. When the drive current S52 is supplied to the electromagnetic 32 of the electromagnetic valve 20, the spool 42 of the electromagnetic valve 20 moves in accordance with this drive current value. As a result, the amount of oil supplied to the automatic transmission 10 is controlled.

The pressure data calculation unit 54 interprets an oil pressure value S151 acquired from the sensor 151, and calculates a fluctuation band ΔP of the pressure value S151 and a fluctuation cycle T of the pressure value S151. The pressure data calculation unit 54 outputs a pressure data S54, which includes this fluctuation band ΔP and fluctuation cycle T, to the vibration determination unit 56.

The mapping memory unit 62 stores a plurality of decision maps M. The decision map M has information on a plurality of threshold values corresponding to an RPM of an engine and a temperature of oil, respectively. In detail, the decision map M matches and maintains a combination of a reference pressure fluctuation bandfluctuation band ΔPo, a first pressure threshold value ΔP1, a second pressure threshold value ΔP2, and a reference fluctuation cycle T0 with respect to a combination of the RPM of the engine and the temperature of oil. The first pressure threshold value ΔP1 is bigger than the reference pressure fluctuation range ΔPo. The second pressure threshold value ΔP2 has a value larger than the first pressure threshold value ΔP1.

According to the preferred embodiment, the decision map M is prepared in plural depending on a kind of vehicle and a kind of automatic transmission 10. The decision condition setting unit 55 reads out the decision map M suitable for the corresponding kind information S513 from the decision map storage unit 62 based on the kind information S513 input from the operating state input unit 51.

The decision condition setting unit 55 acquires the oil temperature information S152 indicating a temperature of oil from the oil temperature sensor 152. The decision condition setting unit 55 refers to the decision map M read-out from the decision map storage unit 62. By doing so, the reference pressure fluctuation bandfluctuation band ΔPo, the first pressure threshold value ΔP1, the second pressure threshold value ΔP2, and the reference fluctuation cycle T0 are determined. The reference pressure fluctuation band ΔPo, the first pressure threshold value ΔP1, the second pressure threshold value ΔP2, and the reference fluctuation cycle T0 correspond to the RPM of the engine S514 acquired from the operating state input unit 51 and the oil temperature information S152 acquired from the oil temperature sensor 152. Further, the decision condition setting unit 55 outputs the decision condition S55 including the first pressure threshold value ΔP1, the second pressure threshold value ΔP2, the third pressure threshold value ΔP3, and the reference fluctuation cycle T0 to the oil pressure state diction unit 56.

The oil pressure state decision unit 56 decides the oil pressure state based on the pressure data S54 input from the pressure data calculation unit 54 and the decision condition S55 input from the decision condition setting unit 55. That is, the oil pressure state decision unit 56 decides the oil pressure state based on the pressure value S151 of oil at the output side of the electromagnetic valve 20. According to the preferred embodiment, as an example of the oil pressure state, the occurrence state of the oil vibration which is a pulsation of oil is decided. Further, the oil pressure state decision unit 56 performs the decision on the oil pressure state at a predetermined interval during the engine operating period. By doing so, the oil pressure state decision unit 56 decides the oil pressure state in plural in the one-time continued engine operating period.

According to the preferred embodiment, the oil pressure state decision unit 56 classifies the oil pressure state into any one of four types of an allowable state, an oil vibration level L=1, an oil vibration level L=2, and an oil vibration level L=3 every 2 [msec].

In detail, when the fluctuation band ΔP of the pressure value S151 is ΔP≤ΔP1 or the fluctuation cycle T of the pressure value S151 is T≥T0, the oil pressure state decision unit 56 decides the oil pressure state as the allowable state (oil vibration level L=0). When the fluctuation band ΔP is ΔP>ΔP1 and the fluctuation cycle T is T<T0, the oil pressure state decision unit 56 decides the oil pressure state as the oil vibration state.

In connection with the oil vibration state, when the fluctuation band ΔP is ΔPo<ΔP≤ΔP2, the oil pressure state decision unit 56 determines the oil pressure state as the oil vibration level L=1 (first level). When the fluctuation band ΔP is ΔP2<ΔP≤ΔP3, the oil pressure state decision unit 56 determines the oil pressure state as the oil vibration level L=2 (second level). When the fluctuation band ΔP is ΔP>ΔP3, the oil pressure state decision unit 56 determines the oil pressure state as the oil vibration level L=3 (third level).

Further, the oil pressure state decision unit 56 outputs the decision result S56 of the oil pressure state to the temporary storage unit 57.

The temporary storage unit 57 temporarily stores the decision result S56 input from the oil pressure state decision unit 56. If the engine operating stop signal S512 is input from the operating state input unit 51, the temporary storage unit 57 outputs the storage data S57 stored in the temporary storage unit 57 to the oil pressure state storage unit 61.

According to the preferred embodiment, the temporary storage unit 57 stores only the latest decision result S56. That is, if a new decision result S56 is input from the oil pressure state decision unit 56, the temporary storage unit 57 updates the decision result stored therein to a newly input decision result S56. By doing so, the storage data S57 output to the oil pressure state storage unit 61 becomes the end time decision result which is the decision result finally decided during the previous continued engine operating period.

Further, according to the preferred embodiment, the past information S61 stored in the oil pressure state storage unit 61 is the previous end time decision result, but the present embodiment is not limited thereto. The past information S61 may store, in times serial, not only the previous end time decision result but also end time decision results of each of the plural-time (for example, three times) latest end time decision results during a past continued operating time of the engine. As such, when the past information S61 includes the plural-time end time decision result, the driving condition setting unit 52 may more appropriately set the driving condition.

The nonvolatile memory 60 is a storage device keeping a storage even when being not supplied with power. For example, the nonvolatile memory is a flash memory, a magnetic disc, an optical disc, etc. The oil pressure state storage unit 61 and the decision map storage unit 62 are installed in the nonvolatile memory 60 to continuously keep data such as the past information S61 or the plurality of decision map M even if the supply of power to the electromagnetic valve control apparatus 50 stops, other than the engine operating period.

4. Drive Frequency Adjustment Process Flow

Figure 4:
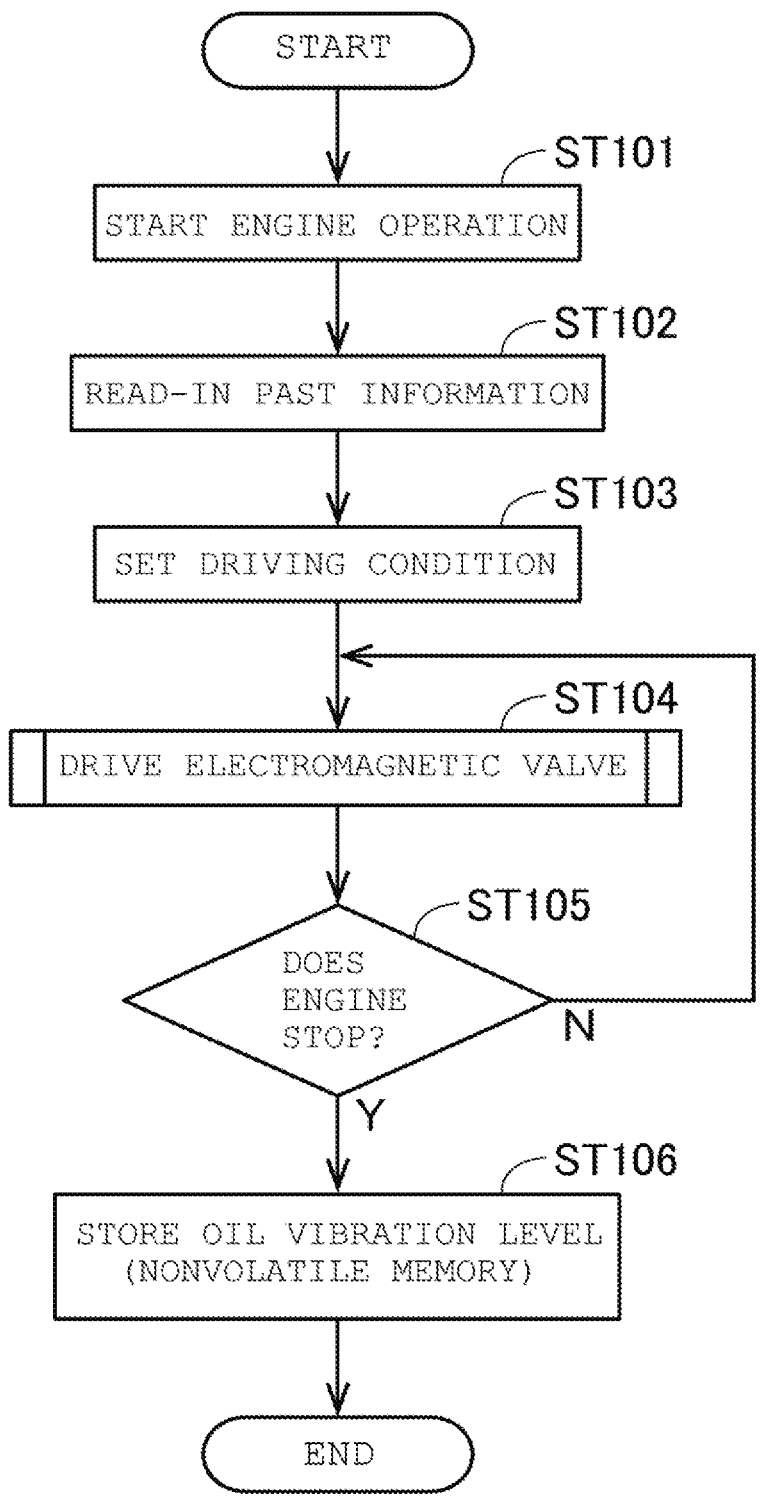
FIG. 4 is a flow chart illustrating the entire flow of driving condition setting processing in the electromagnetic valve control apparatus according to the first preferred embodiment.
Figure 5:
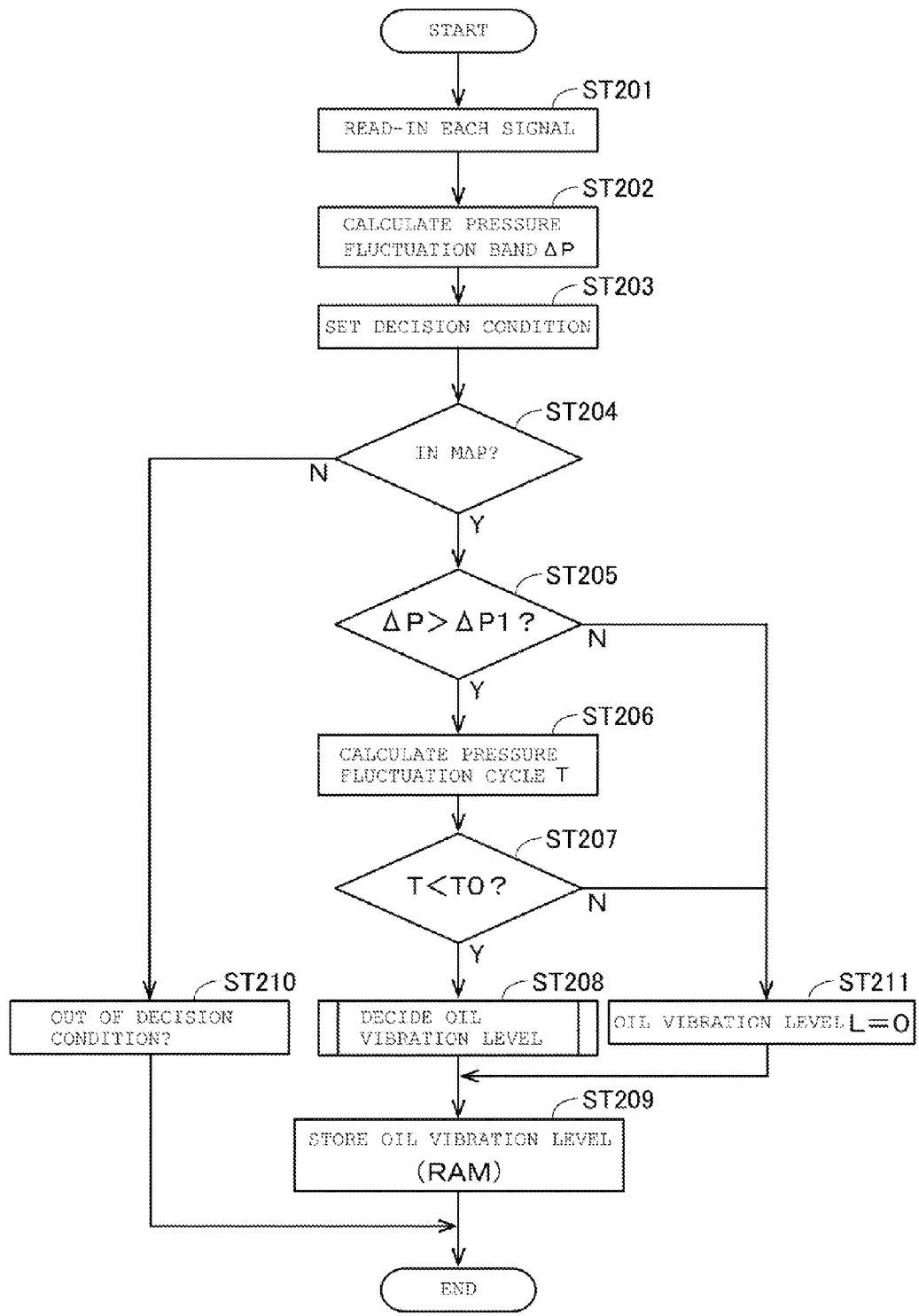
FIG. 5 is a flow chart illustrating a flow of fixed time processing in the electromagnetic valve control apparatus according to the first preferred embodiment.
Figure 6:
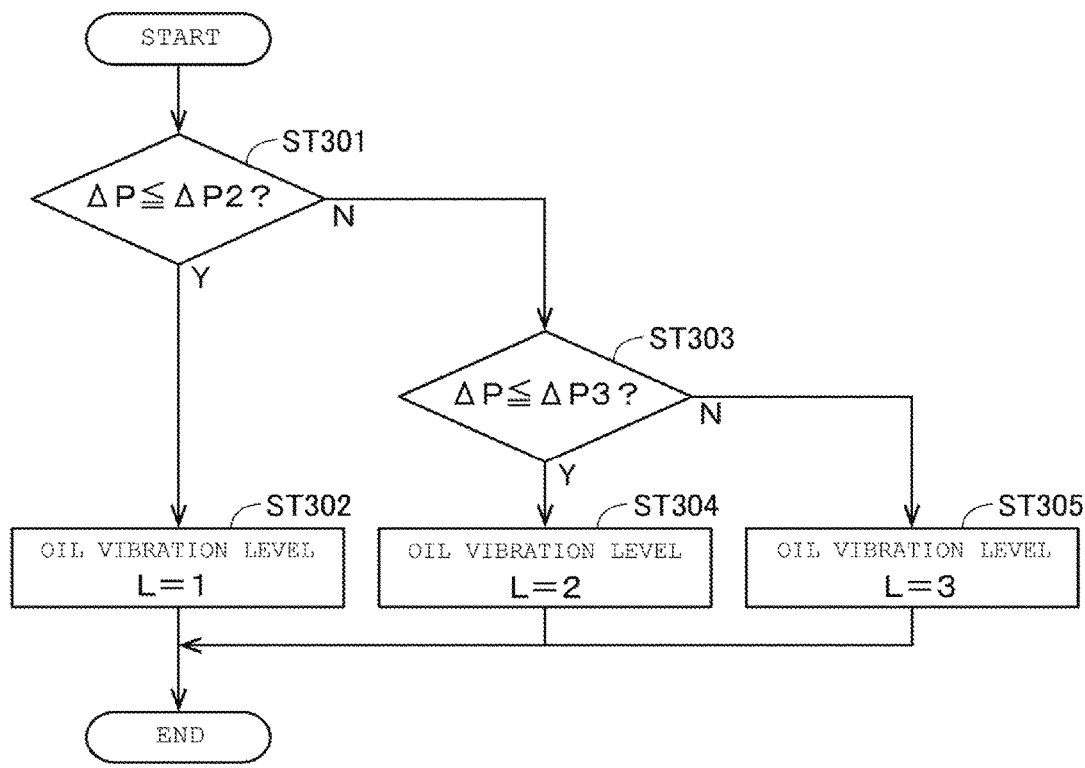
FIG. 6 is a flow chart illustrating a flow of oil vibration level decision processing in the electromagnetic valve control apparatus according to the first preferred embodiment.

Subsequently, a drive frequency adjustment process flow of the electromagnetic valve control system 50 will be explained. FIG. 4 is a flow chart illustrating the entire flow of the driving condition setting processing of the electromagnetic valve control apparatus 50 performed upon the driving of the control valve apparatus 1. FIG. 5 is a flow chart illustrating a flow of fixed time processing of the electromagnetic valve control apparatus 50 performed during the driving of the electromagnetic valve 20. FIG. 6 is a flow chart illustrating a flow of oil vibration level decision processing performed in fixed time processing of the electromagnetic valve control apparatus 50.

First, the electromagnetic valve control apparatus 50 performs the driving condition setting processing illustrated in steps ST101 to ST103 of FIG. 4 when the driving of the control valve apparatus 1 starts. Next, the electromagnetic valve control apparatus 50 repeatedly performs step ST104 of FIG. 4 and the fixed time processing illustrated in FIG. 5 during the driving of the control valve apparatus 1 at a predetermined interval. The interval of the fixed processing is set to be, for example, 2 [msec]. Further, the electromagnetic valve control apparatus 50 performs storage processing to the nonvolatile memory 60 indicated in step ST106 of FIG. 4 when the driving of the control valve apparatus 1 ends.

As illustrated in FIG. 4, according to the preferred embodiment, first, the electromagnetic valve control apparatus 50 determines that an operating start command signal is input from the vehicle information C, which is input to the operating state input unit 51, to the engine (step ST101). Next, the operating state input unit 51 outputs the engine operating start signal S511 to the driving condition setting unit 52.

If the engine driving start signal S511 is input, the driving condition setting unit 52 reads in the past information S61 including the past decision result from the oil pressure state storage unit 61 (step ST102). By doing so, the driving condition setting unit 52 acquires the end time decision result in the previous operation period of the engine.

Next, the driving condition setting unit 52 sets the driving frequency f from the end time decision result in the previous engine operating period (step ST103). According to the preferred embodiment, the driving frequency is selected from several frequencies f0 to f3 previously set depending on the oil vibration level in the end time decision result.

In detail, when the previous end time decision result is an allowable state (oil vibration level 0), the driving condition setting unit 52 selects the lowest frequency f0 from a plurality of frequencies f0 to f3. If the previous end time decision result is the oil vibration level 1, the driving condition setting unit 52 selects the frequency f1 higher than the frequency f0 and lower than the frequencies f2 and f3. If the previous end time decision result is the oil vibration level 2, the driving condition setting unit 52 selects the frequency f2 higher than the frequencies f0 and f1 and lower than the frequency f3. Further, when the previous end time decision result is an oil vibration level 3, the driving condition setting unit 52 selects the highest frequency f3 from a plurality of frequencies f0 to f3.

As such, the driving condition setting unit 52 sets the driving frequency f to be the higher frequency as the oil vibration level is getting higher in the previous engine operating period and suppresses the occurrence of the oil vibration. Meanwhile, the driving condition setting unit 52 sets the driving frequency f to be the lower frequency as the oil vibration level is getting lower in the previous engine operating period and suppresses the deterioration in durability and reliability of the electromagnetic valve 20.

That is, the driving condition setting unit 52 predicts the occurrence situation of the oil vibration in the engine operating period start in consideration of the past occurrence situation of the oil vibration to set the driving frequency f. By doing so, it is possible to suppress the deterioration in durability and reliability of the electromagnetic valve 20 from reducing while setting the oil vibration to be in the allowable range.

If the driving frequency f is set and the driving of the electromagnetic valve 20 starts, the regular processing is performed upon the driving of the electromagnetic valve 20 (step ST104). Each time the regular processing of the step ST104 ends, the electromagnetic valve control apparatus 50 determines whether the engine operating stop information is included in the vehicle information C (step ST105).

In the step ST105, if the electromagnetic valve control apparatus 50 determines that the engine operating stop information is not included in the vehicle information C, the processing returns to the step ST104 and the regular processing is performed again.

Further, in the step ST105, the electromagnetic valve control apparatus 50 does not perform the following regular processing if it is determined that the engine operating stop information is included in the vehicle information C. The electromagnetic valve control apparatus 50 outputs the recorded oil vibration level L from the temporary storage unit 57 and records it in the oil pressure state storage unit 61 of the nonvolatile memory 60.

Next, the regular processing performed in the step ST104 will be described with reference to FIG. 5. The electromagnetic valve control apparatus 50 first performs the read in of each signal upon the starting of the regular processing (step ST201).

In detail, the pressure data calculation unit 54 reads in the pressure value S151 output from the oil pressure sensor 151 and at the same time the decision condition setting unit 55 reads in the oil temperature information S152 output from the oil temperature sensor 152. Further, the operating state input unit 51 of the electromagnetic valve control apparatus 50 outputs the RPM S514 of the engine and the kind information S513 from the vehicle information C to the decision condition setting unit 55.

Further, the pressure data calculation unit 54 analyzes the pressure value S151 input in step S201 to calculate the fluctuation band ΔP of the pressure value S151 (step ST202). In this step ST202, for example, a difference of the pressure value S151 at timing when a differential value of the pressure value S151 becomes zero may be set to be the fluctuation band ΔP of the pressure value S151. However, in another calculation method, the fluctuation band ΔP of the pressure value S151 may be calculated.

Meanwhile, the decision condition setting unit 55 sets the decision condition S55 including the first pressure threshold value ΔP1, the second pressure threshold value ΔP2, the third pressure threshold value ΔP3, and the reference fluctuation cycle T0 which are the decision conditions (step ST203). In the step ST203, first, a kind of vehicles and a kind of automatic transmission 10 included in the kind information S513 are referenced and the decision map M suitable therefor are read out from the decision map storage unit 62. Further, the decision condition setting unit 55 refers to the decision map M and determines the decision condition S55 including the first pressure threshold value ΔP1, the second pressure threshold value ΔP2, the third pressure threshold value ΔP3, and the reference fluctuation cycle T0 which correspond to the oil temperature information S152 and the RPM S153 of the engine.

In step ST203, if it is determined that the RPM S153 of the engine and the oil temperature information S154 do not have the corresponding values in the decision map M (case of No in step ST204), the processing proceeds to step ST210. Further, as the exception of the decision condition, the decision on the oil vibration level is not performed and the regular processing ends (step ST210).

According to the preferred embodiment, each decision condition when the RPM S153 of the engine is equal to or more than 600 [rpm] is described in the decision map M For this reason, the case in which the RPM S153 of the engine is less than 600 [rpm] is the exception of the decision object. Further, the case in which the RPM S153 of the engine is equal to or more than a predetermined value may be set as the exception of the decision object and the decision object may be set based on the oil temperature information S154.

In step ST203, in the case in which the RPM S153 of the engine and the oil temperature information S154 have the corresponding values in the decision map M and each decision condition may be set (case of Yes in step ST204), the processing proceeds to step ST205.

Further, according to the preferred embodiment, steps ST203 and ST204 are performed after step ST202, but the embodiment is not limited thereto. The steps ST203 and ST204 may be performed prior to the step ST202 and may be performed in parallel with the step ST202.

In the step ST205, the oil pressure state decision unit determines whether or not the fluctuation band ΔP of the pressure value S151 is greater than the first pressure threshold ΔP1. When the fluctuation band ΔP is equal to or less than the first pressure threshold value ΔP1, the oil vibration little occurs. For this reason, in the case of ΔP≤ΔP1 (case of No in step ST205), another decision processing (steps ST206 to ST208) on whether there is the oil vibration is not performed, and the processing proceeds to step ST211. Further, in step ST211, it is decided that the oil vibration level L indicating the allowable state is equal to 0.

Meanwhile, in the case of ΔP>ΔP1 (case of Yes in step ST205), next, the pressure data calculation unit 54 analyzes the pressure value S151 received in the step ST201 to calculate the fluctuation cycle T of the pressure value S151 (step ST206). In this step ST206, for example, a time interval of the timing when a differential value of the pressure value S151 becomes zero may be set to be the fluctuation cycle T of the pressure value S151. However, in another calculation method, a fluctuation cycle 8T of the pressure value S151 may be calculated.

Next, the oil pressure state decision unit 56 decides whether the fluctuation cycle T of the pressure value S151 is smaller than the reference fluctuation cycle T0 (step ST207). When the fluctuation cycle T of the pressure value S152 is equal to or bigger than the cycle threshold T0, harmful effect caused by oil vibration seldom occurs since the oil pressure change is gradual. For this reason, in the case of T≥T0 (case of No in step ST207), the processing proceeds to step ST211. Further, in the step ST211, it is decided that the oil vibration level L indicating the allowable state is equal to 0.

Meanwhile, in the case of T<T0 (case in Yes in the step ST207), next, the oil pressure state decision unit 56 performs the decision on the oil vibration level (step ST208). Here, the details of the decision process of the oil vibration level in the step ST208 will be described with reference to FIG. 6.

In the decision process of the oil vibration level in the step ST208, first, the oil pressure state decision unit 56 decides whether the fluctuation band ΔP of the pressure value S151 is equal to or less than the second pressure threshold value ΔP2 (step ST301). In the case of ΔP≤ΔP2 (case of Yes in step ST301), the processing proceeds to step ST302 and the oil vibration is decided as a relatively smaller oil vibration level L=1. Further, in the case of ΔP>ΔP2 (case of No in step ST301), the processing proceeds to step S303.

In the step ST303, the oil pressure state decision unit 56 decides whether the fluctuation band ΔP of the pressure value S151 is larger than the third pressure threshold value ΔP1. In the case of ΔP≤ΔP3 (case of Yes in step ST303), that is, ΔP2<ΔP≤ΔP3, the processing proceeds to step ST304 and the oil vibration level L is decided to be equal to 2. Further, in the case of ΔP>ΔP3, the processing proceeds to step ST305 and the oil vibration is decided to be a relatively larger oil vibration level L=3.

As such, in the decision process of the oil vibration level in the step ST208, the oil vibration level L is decided depending on the value of the fluctuation band ΔP of the pressure value S151.

If the oil vibration level L is decided in the step ST208 or the step ST211, then the oil vibration level L is stored in the temporary storage unit 57 (step ST209). Further, according to the preferred embodiment, if the new oil vibration level L is input from the oil pressure state decision unit 56 to the temporary storage unit 57, the temporary storage unit 57 updates the stored oil vibration level L to a new oil vibration level L. That is, the latest oil vibration level L is stored in the temporary storage unit 57. Further, the plurality oil vibration level L may be stored in the temporary storage unit 57 in time series.

In the one-time continued driving period of the engine, the oil vibration is increased along with the normal passage of time. For this reason, the end time decision result that is the decision result finally decided during the corresponding driving period may be output to the oil pressure state storage unit 61 by storing at least latest oil vibration level L in the temporary storage unit 57.

As such, the oil vibration level L decided by the oil pressure state decision unit 56 is stored in the oil pressure state storage unit 61. By doing so, the driving frequency f may be set in consideration of the oil vibration state in the corresponding driving period upon a next engine operating start. Further, the oil vibration occurrence situation may be predicted in the next driving period of the engine by setting the driving frequency f in consideration of the past oil vibration occurrence situation to set the driving frequency f. As a result, it is possible to suppress the deterioration in durability and reliability of the electromagnetic valve 20 from reducing while setting the oil vibration to be in the allowable range.

2. Second Embodiment

<2-1. Configuration of Electromagnetic Valve Control Apparatus>

Figure 7:
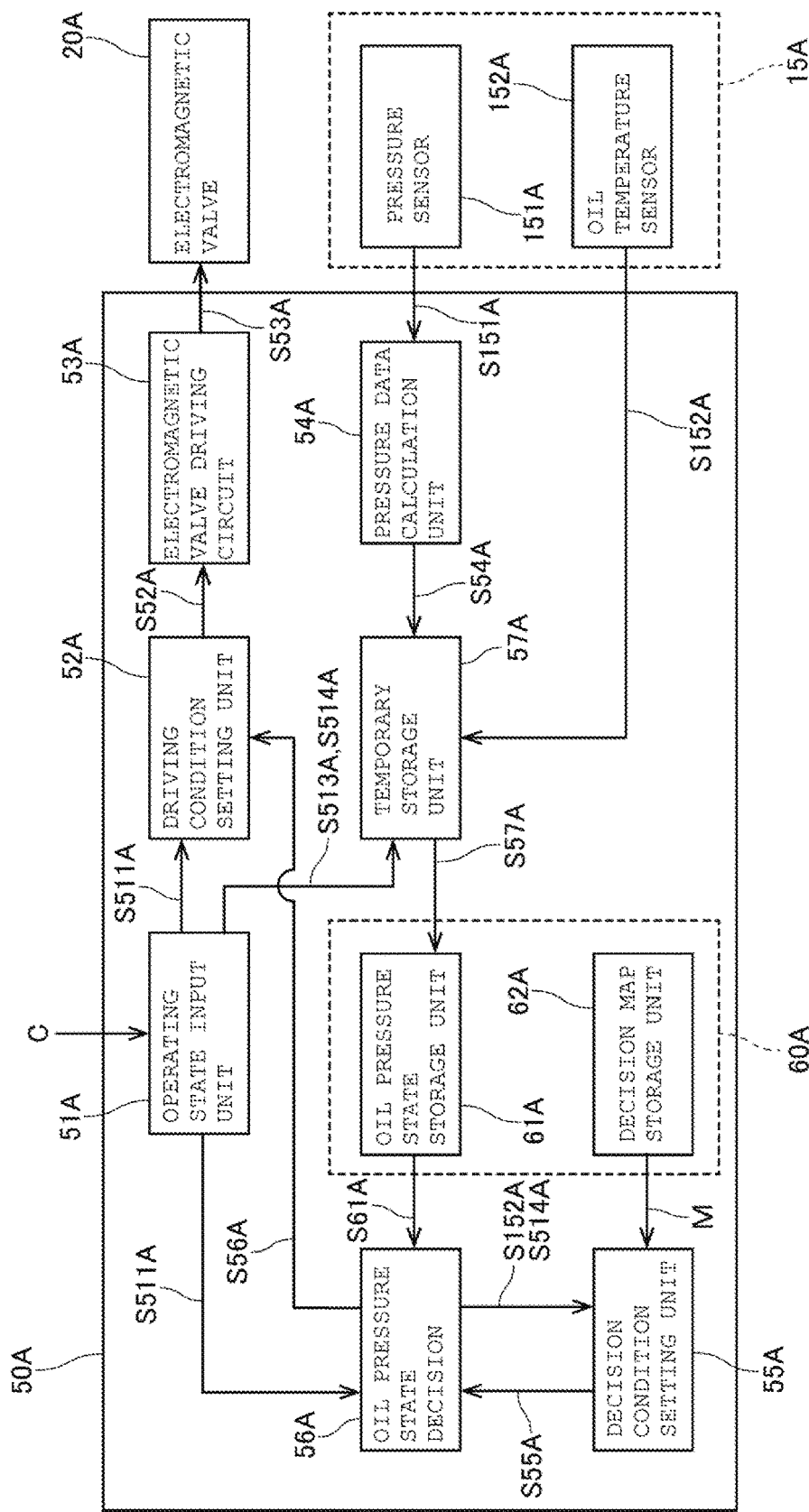
FIG. 7 is a block diagram illustrating a configuration of an electromagnetic valve control apparatus according to a second preferred embodiment.

Next, an electromagnetic valve control apparatus 50A according to a second embodiment will be described with reference to FIG. 7. The electromagnetic valve control apparatus 50A does not perform the decision on the oil vibration level in the regular processing performed in the driving period of the control valve apparatus but performs the decision on the oil vibration level prior to driving the control valve apparatus. Further, the description of parts common to the first exemplary embodiment among the components of the second embodiment will be omitted. FIG. 7 is a block diagram illustrating a configuration of the electromagnetic valve control apparatus 50A.

As illustrated in FIG. 7, the electromagnetic valve control apparatus 50A includes an operation state input unit 51A, a driving condition setting unit 52A, an electromagnetic valve driving circuit 53A, a pressure data calculation unit 54A, a decision condition setting unit 55A, an oil pressure state decision unit 56A, and a temporary storage unit 57A. Further, the electromagnetic valve control apparatus 50 has a nonvolatile memory 60A. The nonvolatile memory 60A includes an oil pressure state storage unit 61A and a decision map storage unit 62A.

The operating state input unit 51A is an input port to which an engine operating state is input. In detail, the operating state input unit 51A inputs the vehicle information C that includes the engine operating states such as the engine operating start information, the engine operating stop information, and the RPM of the engine or the kind of vehicles, the kind of automatic transmission 10, etc. The operating state input unit 51A outputs an engine operating start signal S511A for the driving condition setting unit 52A and the oil pressure state decision unit 56A based on the vehicle information C. Further, the operating state input unit 51A outputs kind information S513A indicating an engine operating stop signal (S512A), the kind of vehicles, and the kind of automatic transmission 10 and an RPM S514A of the engine to the temporary storage unit 57A.

If the operating command signal is input to the engine and the decision result S56A of the oil pressure state is input from the oil pressure state determination unit 56A in the previous driving period of the engine, the driving condition setting unit 52A sets the driving condition of the electromagnetic valve 20A based on the corresponding decision result S56A. In detail, the driving condition setting unit 52A sets the driving frequency f of the driving current S53 supplied to the electromagnetic valve 20A by the electromagnetic valve driving circuit 53 based on the decision result S56A.

According to the preferred embodiment, a worst decision result which is a decision result determined as the worst oil pressure state in the previous continued operating time of the engine is input from the oil pressure state decision unit 56A to the driving condition setting unit 52A. That is, the driving condition setting unit 52 sets the driving frequency f based on the worst decision result of the previous operating period.

The electromagnetic valve driving circuit 53A is similar to the electromagnetic valve driving circuit 53A according to the first embodiment.

The pressure data calculation unit 54A analyzes a pressure value S151A of oil acquired from an oil pressure sensor 151A of the sensor 15A and calculates the fluctuation band $\Delta P$ of the pressure value S151A and the fluctuation cycle T of the pressure value S151A. Further, the pressure data calculation unit MA outputs the pressure data S54A including the corresponding fluctuation band $\Delta P$ and the fluctuation cycle T to the temporary storage unit 57A. Further, the pressure data calculation unit MA performs the data calculation at a predetermined interval in the engine operating time.

The decision condition setting unit 55A refers to the decision map M read-out from the decision map storage unit 62A based on the kind information S513A. By doing so, the decision condition setting unit 55A determines the reference pressure fluctuation band $\Delta P0$, the first pressure threshold value $\Delta P1$, the second pressure threshold value $\Delta P2$, and the reference fluctuation cycle T0 corresponding to the oil temperature information S152A and the RPM S514A of the engine at each time. Further, the decision condition setting unit 55A outputs the decision condition S55A including the reference pressure fluctuation band $\Delta P0$, the first pressure threshold value $\Delta P1$, the second pressure threshold value $\Delta P2$, and the reference fluctuation cycle T0 to the oil pressure state decision unit 56A.

The kind information S513A in the previous operating period of the engine is input from the oil pressure state decision unit 56A to the decision condition setting unit 55A. Further, the oil temperature information S152A and the RPM S514A of the engine are input from the oil pressure state decision unit 56A to the decision condition setting unit 55A at each time upon the previous operating.

If the engine operation start signal S511A is input from the operating state input unit 51A, the oil pressure state decision unit 56A reads out the past information S61A stored in the oil pressure storage unit 61A. By doing so, the oil pressure state decision unit 56A decides the oil pressure state in the previous operating period of the engine. In detail, the oil pressure state at each time are decided based on the pressure data S54A included in the past information S61A and the decision condition S55A corresponding to the corresponding pressure data S54A. That is, the oil pressure state decision unit 56A decides the oil pressure state from the pressure value S151A of oil at the output side of the electromagnetic valve 20 through the pressure data S54A.

The worst decision result S56A is the decision result decided to be the worst oil pressure state. According to the preferred embodiment, the oil pressure state decision unit 56A performs the decision on the oil pressure state on all the stored pressure data S54A over the entire previous operating period of the engine. Next, the oil pressure state decision unit 56A outputs the worst decision result S56A among the decided oil pressure states to the driving condition setting unit 52A.

The temporary storage unit 57A stores the pressure data S54A input from the pressure data calculation unit MA in time series. At the same time, the temporary storage unit 57A stores the RPM S514A of the engine input from the operating state input unit 51A in time series. Further, the temporary storage unit 57A stores the kind information S513A input from the operating state input unit 51A.

If the engine operating stop signal S512 is input from the operating state input unit, the temporary storage unit 57A outputs the pressure data S54A in the corresponding operating period in time series and outputs the RPM S514A of the engine and the kind information S513A to the oil pressure state storage unit 61A.

<2-2. Flow of Driving Condition Setting Processing>

Figure 8:
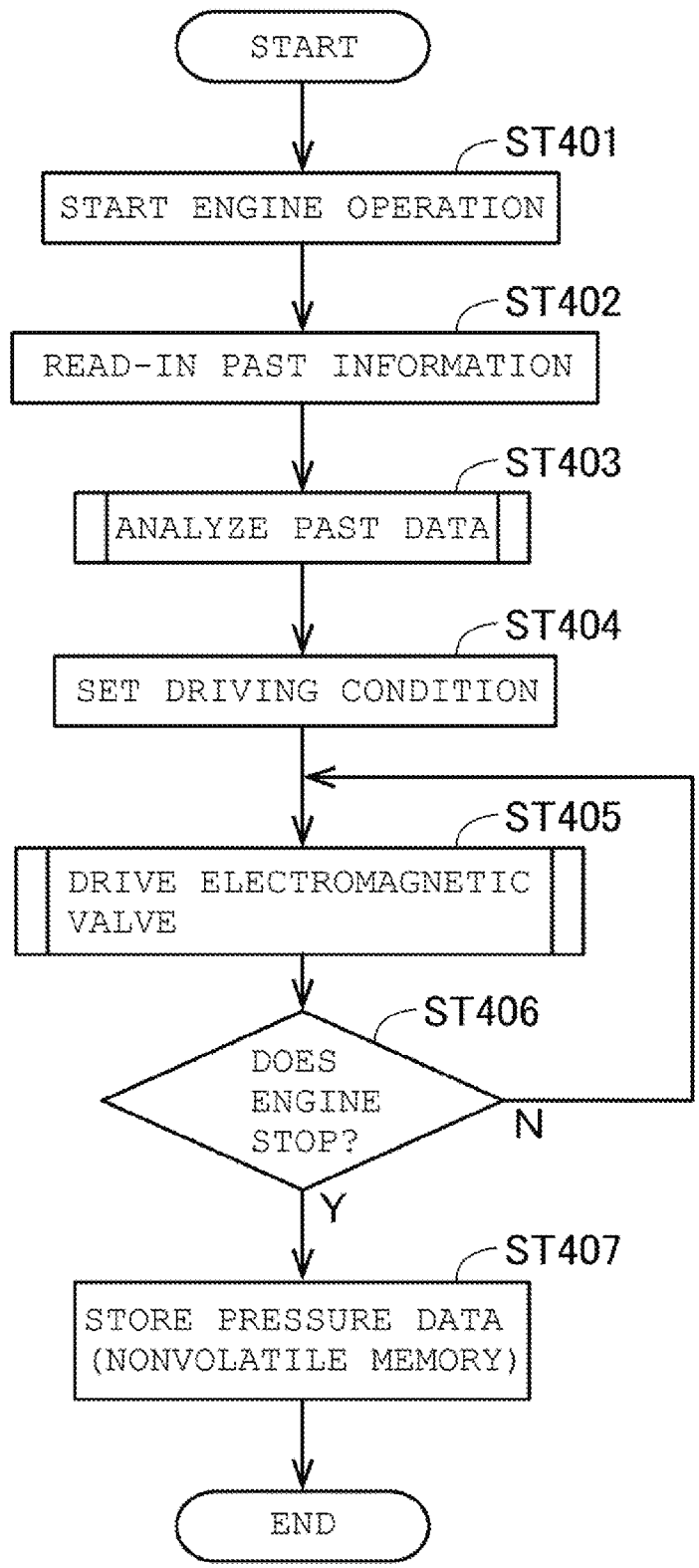
FIG. 8 is a flow chart illustrating the entire flow of driving condition setting processing in the electromagnetic valve control apparatus according to the second preferred embodiment.
Figure 9:
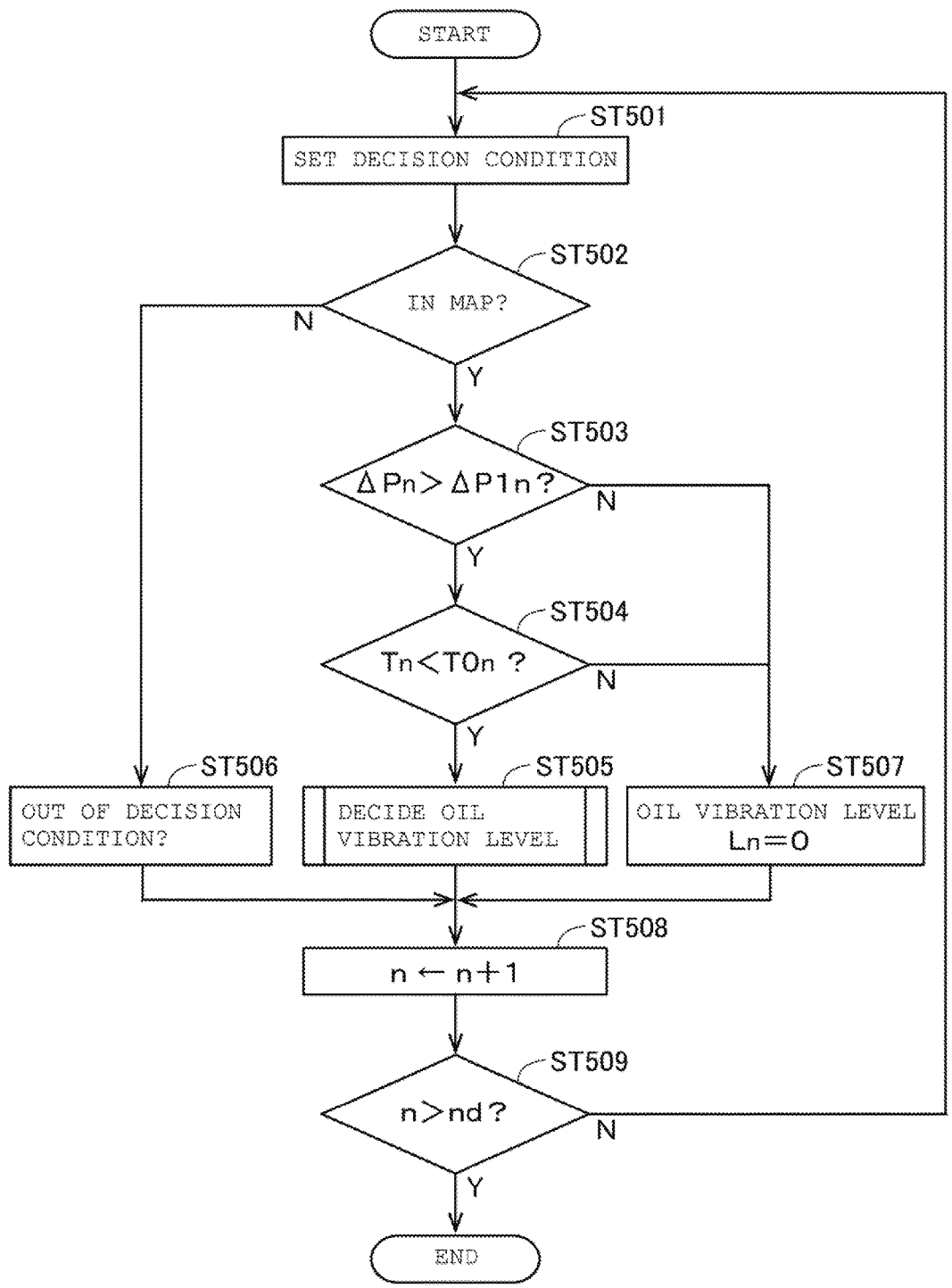
FIG. 9 is a flow chart illustrating a flow of past data analysis processing in the electromagnetic valve control apparatus according to the second preferred embodiment.
Figure 10:
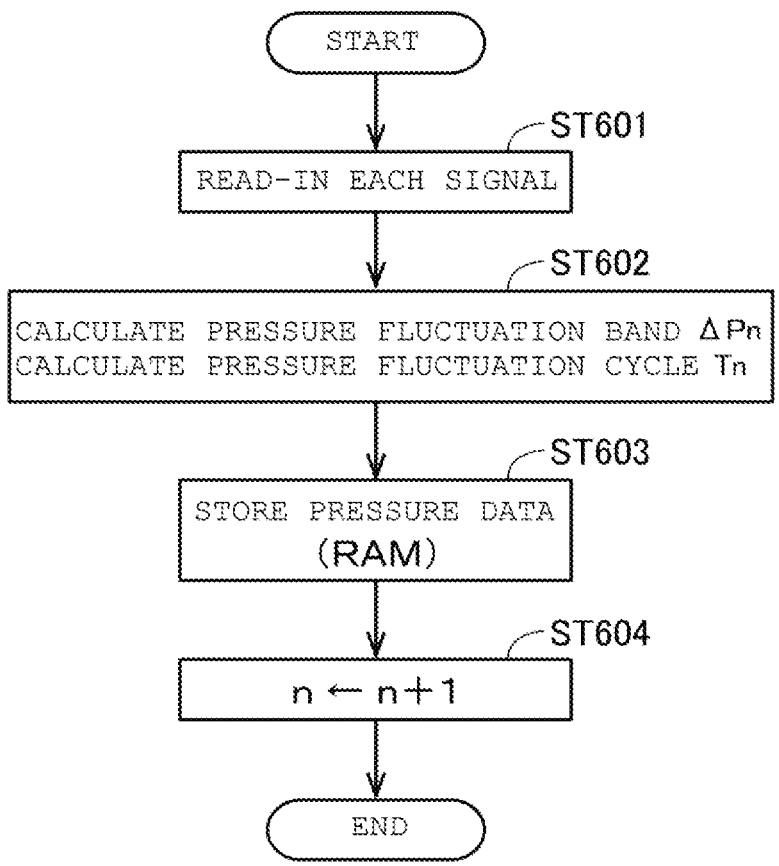
FIG. 10 is a flow chart illustrating a flow of fixed time processing in the electromagnetic valve control apparatus according to the second preferred embodiment.

Next, in the electromagnetic valve control apparatus 50A, the processing flow of setting the driving condition will be described. FIG. 8 is a flow chart illustrating the entire flow of the driving condition setting processing of the electromagnetic valve control apparatus 50A performed upon the driving of the control valve apparatus. FIG. 9 is a flow chart illustrating a flow of past data analysis processing of the electromagnetic valve control apparatus 50A. FIG. 10 is a flow chart illustrating a flow of regular processing of the electromagnetic valve control apparatus.

The electromagnetic valve control apparatus 50A first performs the driving condition setting processing illustrated in steps ST401 to ST404 of FIG. 8 when the driving of the control valve apparatus starts. Next, the electromagnetic valve control apparatus 50A repeatedly performs step ST405 of FIG. 8 and the fixed time processing illustrated in FIG. 10 at a predetermined interval during the driving of the control valve apparatus 50A. The interval of the fixed processing is set to be, for example, 2 [msec]. Further, the electromagnetic valve control apparatus 50A performs storage processing to the nonvolatile memory 60A indicated in step ST407 of FIG. 8 when the driving of the control valve apparatus ends.

As illustrated in FIG. 8, first, the electromagnetic valve control apparatus 50A determines that an operating start command signal is input from the vehicle information C, which is input to the operating state input unit 51A, to the engine (step ST401). Next, the operating state input unit 51 outputs the engine operating start signal S511A to the driving condition setting unit 52A and the oil pressure state decision unit 56A.

When the engine operating start signal S511A is input, the oil pressure state decision unit 56A reads in the past information S61A from the oil pressure state storage unit 61A (step ST402). Here, the past information S61A includes the kind information S513A, the pressure data S54A of an nd pair up to time n=1 to n=nd, the oil temperature information S152A, and the RPM S514A of the engine.

Next, the oil pressure state decision unit 56A analyzes the past pressure data 54A (hereinafter, referred to as "past data") acquired in step ST402 (step ST403). Here, the flow of past data analysis processing in the step ST403 will be described with reference to FIG. 9.

The past information S61A includes the kind information S513A, the RPM S514A of the engine and the oil temperature information S152 which are the analysis object at the time n. In the past data analysis processing in the step ST403, first, the oil pressure state decision unit 56A outputs the kind information S513A and the RPM S514A of the engine and the oil temperature information S152 that are the analysis object at the time n to the decision condition setting unit 55A. Further, the decision condition setting unit 55A sets the decision condition S55 including a first pressure threshold value $\Delta P1n$, a second pressure threshold value $\Delta P2n$, a third pressure threshold value $\Delta P3n$, and a reference fluctuation cycle T0n which are the decision conditions (step ST501).

In addition, prior to the starting of the step ST403, the time n of the analysis object is set to be 1. For this reason, in steps ST501 to ST509 of a first time among the step ST403, a decision on an oil vibration level Ln at time n=1 is performed.

In the step ST501, first, the decision condition setting unit 55A refers to the kind of vehicles and the kind of automatic transmissions included in the kind information S513A and reads out the decision map M suitable therefor from the decision map storage unit 62A. Further, the decision condition setting unit 55A refers to the decision map M and determines the first pressure threshold value $\Delta P1n$, the second pressure threshold value $\Delta P2n$, the third pressure threshold value $\Delta P3n$, and the reference fluctuation cycle T0n, corresponding to the oil temperature information S152A and the RPM S153A of the engine at the time n.

In step ST501, if it is determined that the RPM S153A of the engine and the oil temperature information S154 do not have the corresponding values in the decision map M (case of No in step ST502), the processing proceeds to step ST506. Further, as the exception of the decision condition, the decision on the oil vibration level is not performed and the regular processing ends (step ST506).

Meanwhile, in step ST501, in the case in which the RPM S153A of the engine and the oil temperature information S152A have the corresponding values in the decision map M and each decision condition may be set (case of Yes in step ST502), the processing proceeds to step ST503.

In the step ST503, the oil pressure state decision unit 56A determines whether the fluctuation band $\Delta Pn$ of the pressure value S151A at the time n is larger than the first pressure threshold value $\Delta P1n$. When the fluctuation band $\Delta Pn$ is equal to or less than the first pressure threshold value $\Delta P1n$, the oil vibration little occurs. For this reason, in the case of $\Delta P \Delta P1n$ (case of No in step ST503), the oil pressure state decision unit 56A does not perform another decision processing (steps ST504 and ST505) on whether there is the oil vibration and the processing proceeds to step ST507. Further, in the step ST507, it is decided that the oil vibration level Ln indicating the allowable state is equal to 0. Further, the oil vibration level Ln indicates the oil vibration level at the time n.

Meanwhile, in the case of $\Delta P > \Delta P1n$ (case of Yes in step ST502), next, the oil pressure state decision unit 56A decides whether the fluctuation cycle Tn of the pressure value S151A at the time n is smaller than the reference fluctuation cycle T0n (step ST504). When the fluctuation cycle Tn of the pressure value S151A is equal to or more than the reference fluctuation cycle T0n, the pressure change of oil is smooth and therefore damages due to the oil vibration may be suppressed. For this reason, in the case of Tn T0n (case of No in step ST504), the processing proceeds to step ST507. Further, in the step ST507, it is decided that the oil vibration level Ln indicating the allowable state is equal to 0.

Meanwhile, in the case of Tn<T0n (case in Yes in the step ST504), next, the oil pressure state decision unit 56 performs the decision on the oil vibration level Ln at the time n (step ST505). Here, the details of the decision process of the oil vibration level in the step ST505 are similar to the decision process of the oil vibration level according to the first embodiment illustrated in FIG. 6 and therefore the description thereof will be omitted.

If the oil vibration level Ln is determined in the step ST505 or the step ST507, then the time n that is the decision object is incremented (step ST508). Further, it is decided that a new time n that is the following decision object is larger than nd (step ST509). Further, as described above, the past information S61A includes data such as the pressure data S54 of the nd pair up to time n=1 to nd. For this reason, each data at time n=nd is data just before the previous engine stop.

In the step ST509, if the new time n that is the following decision object is equal to or less than nd (case of No in step ST509), the processing returns to the step STT501 and the analysis processing on the new time n starts.

In the step ST509, when the new time n that is the new decision object is larger than nd (case of Yes in step ST509), since the analysis of the past data on the entire time n=1 to nd included in the past information S61A ends, the past data analysis processing illustrated in FIG. 9 ends and the processing proceeds to the step ST404 of FIG. 8.

A worst oil vibration level Lw is the largest oil vibration level among each of the oil vibration levels Ln for the entire time n=1 to nd included in the past information S61A. When the step ST403 of FIG. 8 and the past data analysis processing illustrated in FIG. 9 end, the oil pressure state decision unit 56A outputs the worst oil vibration level Lw to the driving condition setting unit 52A. The worst oil vibration level Lw, that is, is the worst decision result that is the decision result determined that it is the worst oil pressure state in the previous continued operating period of the engine.

Next, the driving condition setting unit 52A sets the driving frequency f based on the worst oil vibration level Lw in the previous engine operating period (step ST404). The method for setting a driving frequency f in the step ST404 is similar to the step ST103 of FIG. 4 in the first embodiment and therefore the description thereof will be omitted.

As such, according to the preferred embodiment, upon the engine operating start, the driving condition setting unit 52A sets the driving frequency f in consideration of the past worst oil vibration level Lw. For this reason, the oil vibration occurrence situation in the following driving period of the engine may be predicted by setting the driving frequency f in consideration of the past oil vibration occurrence situation to set the driving frequency f. As a result, it is possible to suppress the deterioration in durability and reliability of the electromagnetic valve 20 from reducing while setting the oil vibration to be in the allowable range.

If the driving frequency f is set and the driving of the electromagnetic valve 20 starts, the fixed time processing is performed upon the driving of the electromagnetic valve 20 (step ST405). Each time the regular processing of the step ST405 ends, the electromagnetic valve control apparatus 50A determines whether the engine operating stop information is included in the vehicle information C (step ST406).

In the step ST406, if the electromagnetic valve control apparatus 50A determines that the engine operating stop information is not included in the vehicle information C, the processing returns to the step ST405 and the regular processing is performed again.

Further, in the step ST406, if the electromagnetic valve control apparatus 50A determines that the engine operating stop information is included in the vehicle information C, the electromagnetic valve control apparatus 50A does not perform the following regular processing but outputs each data recorded in the temporary storage unit 57A to the nonvolatile memory 60A to be recorded in the oil pressure state storage unit 61A of the nonvolatile memory 60A.

Next, the regular processing performed in the step ST405 will be described with reference to FIG. 10. In addition, prior to the starting of the step ST405, the time n is set to be 1.

Upon the starting of the regular processing, first, the electromagnetic valve control apparatus 50 performs the read in of each signal (step ST601). In detail, the pressure data calculation unit 54A reads in the pressure value S151A output from the oil pressure sensor 151A. The electromagnetic valve control apparatus 50A sets the time when the pressure data calculation unit 54A performs the read in of the pressure value S151A to be n.

Further, simultaneously with the read in of the pressure data calculation unit 54A, the oil temperature information S152A at the time n and the RPM S514A of the engine at the time n are input from the oil temperature sensor 152A and the operating state input unit 51A to the temporary storage unit 57A. Further, the temporary storage unit 57A stores the time n, the oil temperature information S152A at the time n, and the RPM S514A of the engine at the time n.

Further, the pressure data calculation unit MA analyzes the pressure value S151A input in step S601A to calculate the fluctuation band ΔPn and the pressure fluctuation cycle Tn of the pressure value S151A (step ST602).

Next, the time n, the fluctuation band ΔPn, and the pressure fluctuation cycle Tn that are input from the pressure data calculation unit MA are output to the temporary storage unit 57A. The temporary storage unit 57A stores the fluctuation band ΔPn and the pressure fluctuation cycle Tn along with the oil temperature information S152A and the RPM S514A of the engine at the time n stored in the ST601 (step ST603).

Next, the time n is incremented (step ST604). By doing so, a time-series relationship between each data already stored in the temporary storage unit 57A and each data stored in the temporary storage unit 57A in the regular processing after the next time may be differentiated.

According to the second embodiment, the decision on the oil vibration level is not performed in the regular processing performed during the driving period of the control valve apparatus and may be performed before the driving of the control valve apparatus. Further, according to the preferred embodiment, the pressure fluctuation band ΔPn and the pressure fluctuation cycle Tn are calculated during the regular processing and these values are stored in the oil pressure state storage unit 61A, but the present disclosure is not limited thereto. The time-series data of the pressure value S151A output from the oil pressure sensor 151A may be stored in the oil pressure state storage unit 61A and the pressure fluctuation band ΔPn and the pressure fluctuation cycle Tn may be performed prior to the driving of the control valve apparatus.

Further, according to the preferred embodiment, the decision on the oil pressure level is performed prior to the control valve apparatus, but when even after the engine operating stop, the supply of power to the electromagnetic valve control apparatus 50A may be secured by a predetermined time, the decision on the oil pressure level may be performed after the engine operating stop.

3. Modification Example

Hereinabove, the exemplary embodiment of the present disclosure is described but the present disclosure is not limited the above-mentioned embodiments.

In the above-mentioned embodiments, as the oil pressure state which is a reference setting the driving conditions of the engine, the oil vibration level, that is, the oil vibration state has been used. However, an index indicating other oil pressure states such as a pressure hysteresis amount, etc., which is a difference between the pressure value upon the increase in the driving current value and the pressure value upon the decrease in the driving current value may be used as a reference setting the driving condition of the engine.

In the above-mentioned embodiment, the pressure condition set by the driving condition setting unit is the driving frequency. However, the driving condition setting unit may set other conditions such as the reference current value of the pulse-like driving current.

The detailed shape of the electromagnetic valve may be different from the shapes illustrated in each diagram of the present disclosure. The electromagnetic valve driving circuit 53 may apply a type of current other than a pulsed current to the electromagnetic valve. The electromagnetic valve may also be driven by a so-called analogue drive current.

The present disclosure may be used in, for example, the electromagnetic valve control apparatus and the electromagnetic valve control method.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An electromagnetic valve control apparatus controlling an electromagnetic valve interposed in an oil passage in a control valve apparatus supplying driving oil to an automatic transmission for a vehicle, comprising:
   an electromagnetic valve driving circuit structured to apply a driving current to the electromagnetic valve based on a set driving condition;
   an operating state input unit structured to input an engine operating state of the vehicle;
   an oil pressure state decision unit structured to decide an oil pressure state from a pressure value of the oil at an output side of the electromagnetic valve;
   a storage unit structured to store decision results of the oil pressure state decision unit; and
   a driving condition setting unit structured to set the driving condition based on the decision results stored in the storage unit in response to a determination that an engine operating command signal is input based on the operating state input to the operating state input unit.

2. The electromagnetic valve control apparatus of claim 1, wherein the driving condition comprises a driving frequency of the driving current.

3. The electromagnetic valve control apparatus of claim 2, wherein the driving condition setting unit is structured to select and set the driving frequency from a plurality of preset frequencies.

4. The electromagnetic valve control apparatus of claim 1, further comprising:
   a data calculation unit calculating pressure data comprising a pressure fluctuation band and a pressure fluctuation cycle from the pressure value of the oil at the output side of the electromagnetic valve,
   wherein the oil pressure state decision unit is structured to decide an occurrence state of oil vibration based on the pressure data.

5. The electromagnetic valve control apparatus of claim 4, wherein the oil pressure state decision unit is structured to:
   decide that the oil is in an oil vibration state when the pressure fluctuation band is larger than a preset first pressure threshold value and the pressure fluctuation cycle is smaller than a preset period threshold value and
   decide that the oil is in an allowable oil vibration state when the pressure fluctuation band is equal to or less than the first pressure threshold value or the pressure fluctuation cycle is equal to or more than the period threshold value.

6. The electromagnetic valve control apparatus of claim 5, wherein the oil pressure state decision unit is structured to decide an oil vibration level to be a first level when the pressure fluctuation band is equal to or less than a preset second pressure threshold value,
   decide the oil vibration level to be a second level when the pressure fluctuation band is larger than the second pressure threshold value and is equal to or less than a preset third pressure threshold value and
   decide the oil vibration level to be a third level when the pressure fluctuation band is larger than the third pressure threshold value.

7. The electromagnetic valve control apparatus of claim 1, wherein the oil pressure state decision unit is structured to decide the oil pressure state plural times in a one-time continued engine operating period,
   the storage unit is structured to store an end time decision result that is the decision result finally decided in the at least continued engine operating period, and
   the driving condition setting unit is structured to set the driving condition based at least on the end time decision result.

8. The electromagnetic valve control apparatus of claim 1, wherein the oil pressure state decision unit is structured to decide the oil pressure state plural times in a one-time continued engine operating period,
   the storage unit is structured to store a worst decision result that is the decision result of determining the oil pressure state to be worst in the at least continued engine operating period, and
   the driving condition setting unit is structured to set the driving condition based on at least a previous worst decision result.

9. The electromagnetic valve control apparatus of claim 1, wherein the storage unit is structured to store the decision results obtained plural times in a one-time continued engine operating period, and
   the driving condition setting unit is structured to set the driving condition based on the decision results.

10. An electromagnetic valve control apparatus controlling an electromagnetic valve interposed in an oil passage in a control valve apparatus supplying driving oil to an automatic transmission for a vehicle, comprising:
    an electromagnetic valve driving circuit structured to apply a driving current to the electromagnetic valve based on a set driving condition;
    an operating state input unit structured to input an engine operating state of the vehicle;
    a storage unit structured to store a pressure value of the oil at an output side of the electromagnetic valve;
    an oil pressure state decision unit structured to decide an oil pressure state based on the pressure value stored in the storage unit; and
    a driving condition setting unit structured to set the driving condition based on the decision results of the oil pressure state decision unit if it is determined that an operating command signal of the engine is input based on the operating state input to the operating state input unit.

11. An electromagnetic valve control method controlling the electromagnetic valve by applying a driving current to the electromagnetic valve interposed between an input side and an output side of an oil passage in a control valve apparatus supplying driving oil to an automatic transmission for a vehicle, the electromagnetic valve control method comprising:
    detecting a pressure value of the oil at an output side of the electromagnetic valve;
    deciding an oil pressure state from the pressure value after the detection of the pressure value);
    storing a decision result of the deciding the oil pressure state in a storage unit; and
    setting a driving frequency of a driving current applied to the electromagnetic valve based on the decision result stored in the storage unit.

12. An electromagnetic valve control method controlling the electromagnetic valve by applying a driving current to the electromagnetic valve interposed between an input side and an output side of an oil passage in a control valve apparatus supplying driving oil to an automatic transmission for a vehicle, the electromagnetic valve control method comprising:
- detecting a pressure value of the oil at an output side of the electromagnetic valve;
- storing the pressure value in a storage unit;
- deciding an oil pressure state from the detected pressure value stored in the storage unit; and
- setting a driving frequency of a driving current applied to the electromagnetic valve based on a decision result of the deciding the oil pressure state.

* * * * *